L. FLEISCHMANN.
SYSTEM OF DISTRIBUTION.
APPLICATION FILED APR. 10, 1908.
905,509.
Patented Dec. 1, 1908.
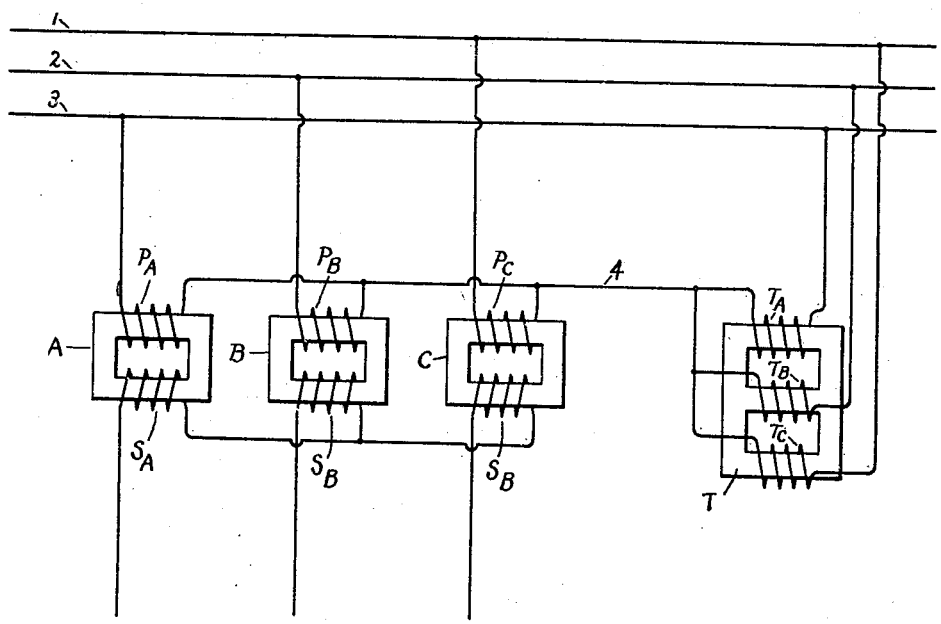
Witnesses
J Earl Ryan
J. Ellis Glen
Inventor:
Lionel Fleischmann
by Albert G. Davis
Atty.

UNITED STATES PATENT OFFICE.

LIONEL FLEISCHMANN, OF BERLIN, GERMANY, ASSIGNOR TO GENERAL ELECTRIC COMPANY, A CORPORATION OF NEW YORK.

SYSTEM OF DISTRIBUTION.

No. 905,509.  Specification of Letters Patent.  Patented Dec. 1, 1908.

Application filed April 10, 1908.  Serial No. 426,256.

*To all whom it may concern:*

Be it known that I, LIONEL FLEISCHMANN, a citizen of the United States, residing at Berlin, Germany, have invented certain new and useful Improvements in Systems of Distribution, of which the following is a specification.

My invention relates to three-phase alternating-current distribution systems, and has for its object the formation of a stable neutral point when transformers are connected to such a system in a certain fashion.

It has been found that when single-phase transformers have their primaries connected with a Y-connection across the conductors of a three-phase system, and have their secondaries also Y-connected, that the neutral point of these transformers is unstable and the voltage across each transformer is not equal to the line voltage divided by the square-root of three. Frequently it is necessary to operate transformers with such a connection and to have the neutral point stable, and the object of my invention is to furnish such a stable neutral point with such a connection for the transformer. I accomplish this object by connecting a three-phase reactance coil or transformer across the conductors of the system in parallel with the primaries of the single-phase transformer and connecting the neutral points of the single-phase transformer and the three-phase reactance or transformer together. The reason why I may obtain a stable neutral with this connection is as follows: In a three-phase alternating-current distribution system no triple harmonic can exist upon the conductors of such a system, for at any moment the sum of the currents flowing in the conductors must be equal to zero, as is well known. When, however, a single-phase transformer is connected across two of the conductors, or three single-phase transformers are connected with a Y-connection on the primaries and no delta-connection on the secondaries, across the line conductors, there will be a triple harmonic voltage induced in each transformer on account of the hysteresis in the iron. This is due to the fact that for an impressed sine wave-shaped electromotive force there must be existing a triple harmonic term in the magnetizing current, and hence a triple harmonic voltage. This triple harmonic voltage will form a resultant with the fundamental voltage induced in the windings of the transformer, and will thus produce an unstable neutral.

In a three-phase transformer or reactance having no substantial magnetic leakage no flux of triple frequency can exist, since at any instant the magneto-motive forces tending to produce a triple harmonic flux will always be in the same direction in the different legs of the transformer or reactance, and will, therefore, balance each other. If, then, three single-phase transformers with a Y-connection of the primaries and a Y-connection of the secondaries be connected across a three-phase circuit, across which is also connected a three-phase transformer or reactance, and if the neutral points of the three-phase reactance or transformer and the neutral point of the primaries of the three single-phase transformers be connected together, a stable neutral will be produced, and a triple harmonic current will flow across the conductor connecting the two neutral points.

For a further understanding of my invention, reference may be had to the accompanying drawing, where 1, 2 and 3 show the conductors of a three-phase alternating-current system fed from some suitable source. Connected to these conductors I have shown the single-phase transformers A, B and C, with their primaries $P_A$, $P_B$ and $P_C$ connected in a Y-connection across the conductors 1, 2 and 3. I have also shown their secondaries $S_A$, $S_B$ and $S_C$ connected in Y, which secondaries may feed suitable translating devices in the manner well known in the art, which devices I have not shown. I have also shown a three-phase reactance with primary windings $T_A$, $T_B$ and $T_C$ connected with a Y-connection across the conductors 1, 2 and 3, and having its neutral point connected by the conductor 4 to the neutral point of the three single-phase transformers.

While I have diagrammatically shown a three-phase reactance or a three-phase transformer with no secondary winding, it will be obvious to those skilled in the art that a secondary winding may be introduced upon the core T, which secondary winding may supply translating devices in the well known fashion, and in the appended claims I use the word "reactance" to mean either a transformer or a reactive coil.

While I have shown a certain arrangement of parts and connections for carrying out my invention, I do not limit myself to these arrangements, but seek in the appended claims to cover any arrangement or connection of parts which will be within the scope of my invention, and will be obvious to those skilled in the art.

What I claim as new and desire to secure by Letters Patent of the United States is:

1. In combination, a plurality of single-phase transformers so connected across the polyphase electrical system as to have an unstable neutral, and a star-connected polyphase reactance connected across the system with its neutral point connected to the neutral point of the single-phase transformers.

2. In a system of three-phase electrical distribution, single-phase transformers Y-connected to the system and Y-connected to translating devices, and a three-phase Y-connected reactance connected to the system, with its neutral point connected to the neutral point of the single-phase transformers.

3. In combination, a three-phase alternating-current source, conductors leading from the source, single-phase transformers with their primaries connected in Y-connection across the conductors and their secondaries connected in Y-connection, and a three-legged magnetic core with a winding surrounding each leg, said windings being connected in Y-connection across the conductors and having their neutral point connected to the neutral point of the three single-phase transformers.

In witness whereof, I have hereunto set my hand this 30th day of March, 1908.

LIONEL FLEISCHMANN.

Witnesses:
FRIEDRICH EICHBERG,
RICHARD NEUMANN.